June 25, 1935. R. B. KNIGHT ET AL 2,006,074
CUTTING TABLE
Filed May 15, 1934    2 Sheets-Sheet 1
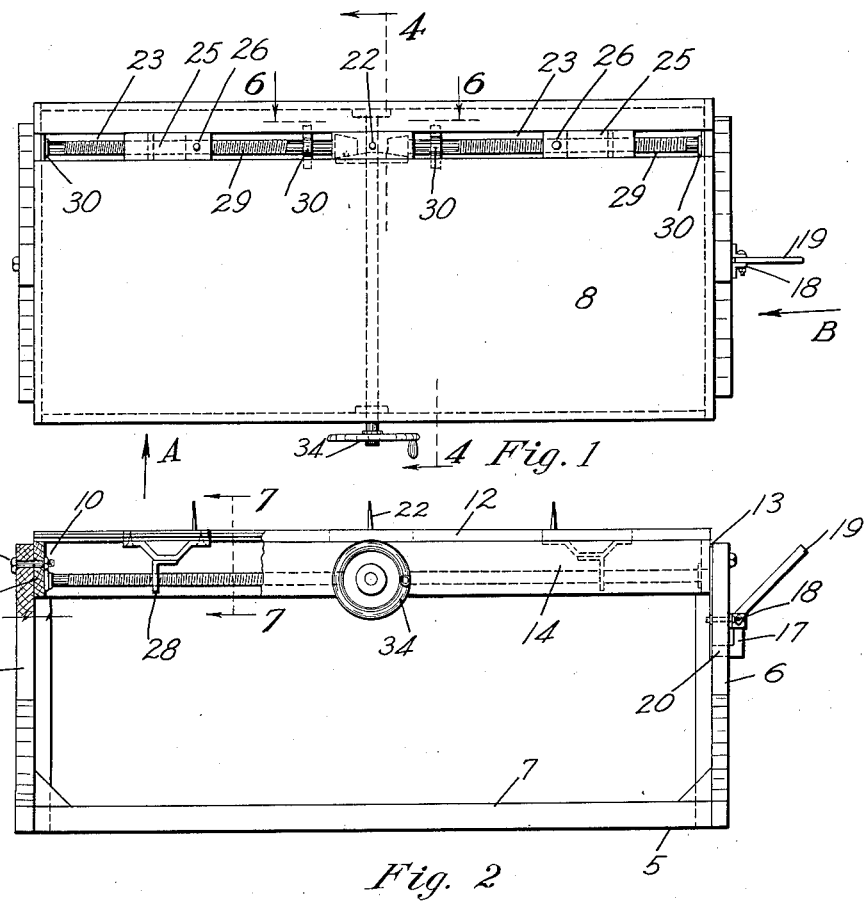
Fig. 1
Fig. 2
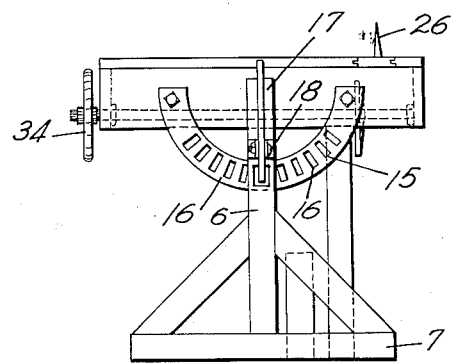
Fig 3
INVENTOR.
R. B. Knight and L. Kahn
BY
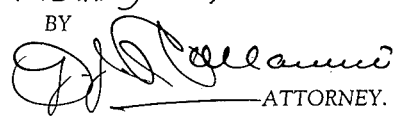
ATTORNEY.

June 25, 1935.  R. B. KNIGHT ET AL  2,006,074
CUTTING TABLE
Filed May 15, 1934   2 Sheets-Sheet 2
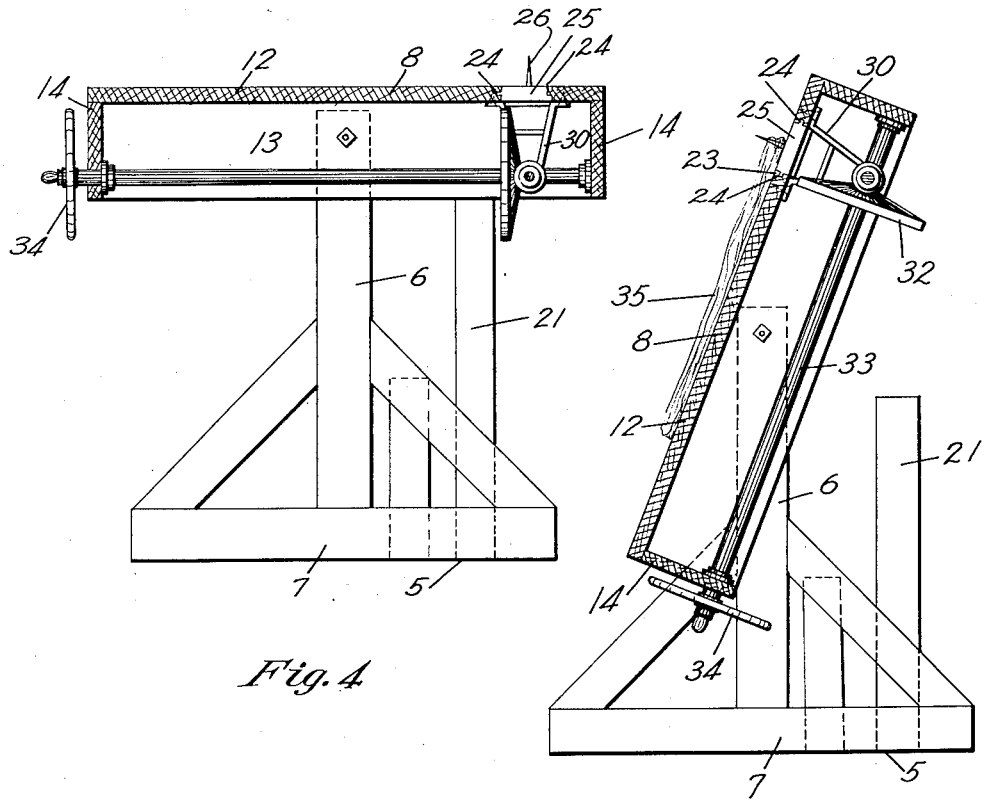
Fig. 4
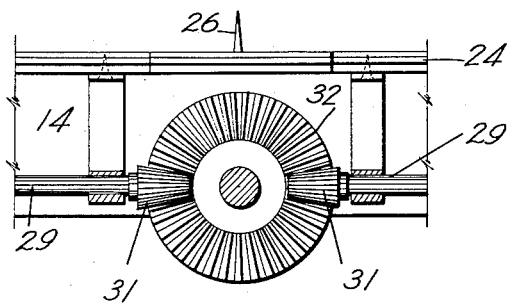
Fig. 5
Fig. 6
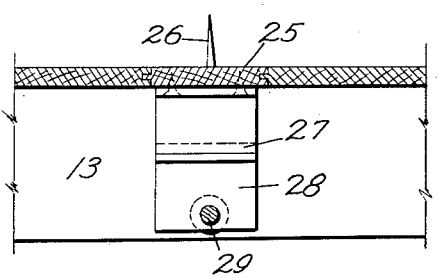
Fig. 7
INVENTOR.
R.B. Knight and L. Kahn
BY
ATTORNEY.

Patented June 25, 1935

2,006,074

UNITED STATES PATENT OFFICE 2,006,074

CUTTING TABLE

Robert B. Knight and Laskar Kahn, Denver, Colo., assignors to The Colorado Bedding Company, Denver, Colo.

Application May 15, 1934, Serial No. 725,747

5 Claims. (Cl. 164—78)

This invention relates to a cutting table for use in cutting layers of fabric to any desired size.

The invention is particularly adapted for use in bedding factories for cutting ticks, pillow covers, and other similar articles used in the manufacture of bedding; and its primary object is to provide a simple and highly efficient and practical device by which ticks, pillow covers, and other kindred fabric materials may be cut accurately to a desired size in large quantities and in the minimum of time.

With this and other objects in view, the invention comprises a table having along an edge of its top a plurality of adjustable pins or pegs to secure a number of layers of fabric material in a taut condition, which permits of their being cut simultaneously in a transverse direction and which is adjustable to bring the pins within easy reach of the operator for the application of the material prior to the cutting operation.

The table, according to this invention, includes handy and easily operated means for the adjustment of the pins and for the adjustment of its top to the positions required for the application of the material and the subsequent operation of cutting the same to predetermined sizes.

An embodiment of the invention has been illustrated in the accompanying drawings, in the several views of which like parts are similarly designated, and in which Figure 1 is a plan view of the table, Figure 2 a sectional front elevation of the same, looking in the direction of the arrow A in Figure 1, Figure 3 an end elevation looking in the direction of the arrow B in Figure 1, Figure 4 an enlarged transverse section on the line 4—4 of Figure 1, showing the table top in the position it occupies during the cutting operation, Figure 5 a similar section with the top in the position in which it is placed for the application of the material, Figure 6 an enlarged fragmentary section along the line 6—6 of Figure 1, and Figure 7 an enlarged fragmentary section taken on the line 7—7 of Figure 2.

Referring further to the drawings, the cutting table comprises a stand or supporting frame 5 composed of two suitably braced uprights 6 connected by a base-board 7. The table top 8 is pivotally mounted between the uprights for movement about a central horizontal axis by means of bolts 9 held in place by nuts 10.

The top is composed of a face member 12 having end flanges 13 and side flanges 14, which, together, form a recess to contain an operating mechanism hereinafter to be described. The pivot bolts extend through horizontally alined holes in the end flanges.

At an end of the top is a segment 15 having a number of equidistantly spaced apertures 16 as shown in Figure 3, and the corresponding upright of the stand or supporting frame carries a dog 17 which cooperates with the segment to hold the table top in its adjusted positions.

The dog is pivoted exteriorly of the upright as at 18; its upper end portion slants outwardly to provide a handle 19, and its opposite end is bent at an angle to provide a detent 20 which engages in the apertures of the segment. Upright rests 21 on the frame aid in supporting the top in a substantially horizontal position, and a stop 21 on the baseboard of the supporting frame limits the movement of the top about its pivotal axis to a slanting or upright position.

The top has centrally of one of its longitudinal edges a fixed, upwardly projecting pin or peg 22, and extending in opposite directions from this pin are guide slots 23 extending parallel to said edge. Slidably fitted in the guide slots by means of grooves and tenons, as shown at 24 in Figures 4 and 5, are two slides 25 which carry upwardly projecting pins or pegs 26 corresponding in size and form to the stationary pin 22. The pin-carriers 25, whose upper surfaces are flush with the face of the table top, have downwardly extending stirrups 27, at the lower ends of which are angles 28 provided with screw-threaded apertures. Working in these apertures are screw-shafts 29 which are supported for rotation in bearings 30 in the recess of the table top. Beveled pinions 31 at corresponding ends of the screw-shafts mesh with a beveled gear wheel 32 on a transverse drive-shaft 33, which is rotatably supported in bearings on the side flanges of the table top.

The shaft projects through the side flange at the front of the top, and is there provided with a crank-wheel 34 for its manual rotation. It will be apparent that by rotation of the drive shaft by means of its crank-wheel, the two pin-carriers are moved simultaneously in their respective guide-ways in opposite directions, to vary their distances from each other and from the intermediately disposed fixed pin.

In the operation of the table, the top is first moved to a vertical or slanting position, as is shown in Figure 5, in which position it is held by the dog 17 engaging in an aperture of the segment 15. In this position of the top, the pins 22 and 26 are within easy reach of an operator standing in front of the table, to suspend therefrom the material to be cut into predetermined sizes. The operator first adjusts the movable pins according to the length of the material and then presses the material upon and over the pins, which are of sufficient length to penetrate a number of layers of the material, as indicated at 35 in Figure 5.

The material thus suspended from the pins is stretched by hand, but any play is readily taken up by moving the pin-carriers further apart by manipulation of the hand-wheel.

After the material has been applied to the pins, the table top is returned to a horizontal position, as shown in Figure 4, after which the operator cuts it to the desired sizes along transverse lines by any of the hand-operated or power driven cutting appliances at present in use. The pins hold the material in the proper position during the cutting operation and permit of a number of sheets of the material being cut to the required size in one operation, without the possibility of lengthwise displacement.

It will thus be observed that the cutting table provides a time and labor saving device to accurately cut ticks, pillow covers, and other kindred appliances.

Variations in the construction and arrangement of the various parts of the device may be resorted to without departing from the scope and spirit of the invention as defined in the hereunto appended claims.

What we claim and desire to secure by Letters Patent is:

1. A cutting table comprising a top, slides movable along an edge thereof, upwardly projecting pins carried by the slides, and mechanism for moving the slides to vary the distance between their pins, including screw-shafts beneath the top, in driving relation to the slides, a drive shaft, and gearing for rotation of the screw-shafts by rotation of the drive shaft.

2. A cutting table comprising a top, slides movable along an edge thereof, upwardly projecting pins carried by the slides, and mechanism for moving the slides to vary the distance between their pins, including screw-shafts beneath the top, in driving relation to the slides, a drive shaft, a hand-wheel on the drive shaft at a side of the top, and gearing for rotation of the screw-shafts by rotation of the drive shaft.

3. A cutting table comprising a top having guide slots along an edge thereof, slides in the slots, flush with the surface of the top, upwardly projecting pins carried by the slides, and mechanism for moving the slides in their slots.

4. A cutting table comprising a top, a stationary pin projecting upwardly at an edge thereof, pins movably mounted at opposite sides of the stationary pin, and mechanism for moving the movable pins simultaneously in opposite directions to vary their distances from the stationary pin.

5. A cutting table comprising a top, three pins disposed in substantial alinement adjacent an edge of the top, and mechanism for moving two of the pins in opposite directions, the third pin being fixedly held on the table.

ROBERT B. KNIGHT.
LASKAR KAHN.